Figure 1:
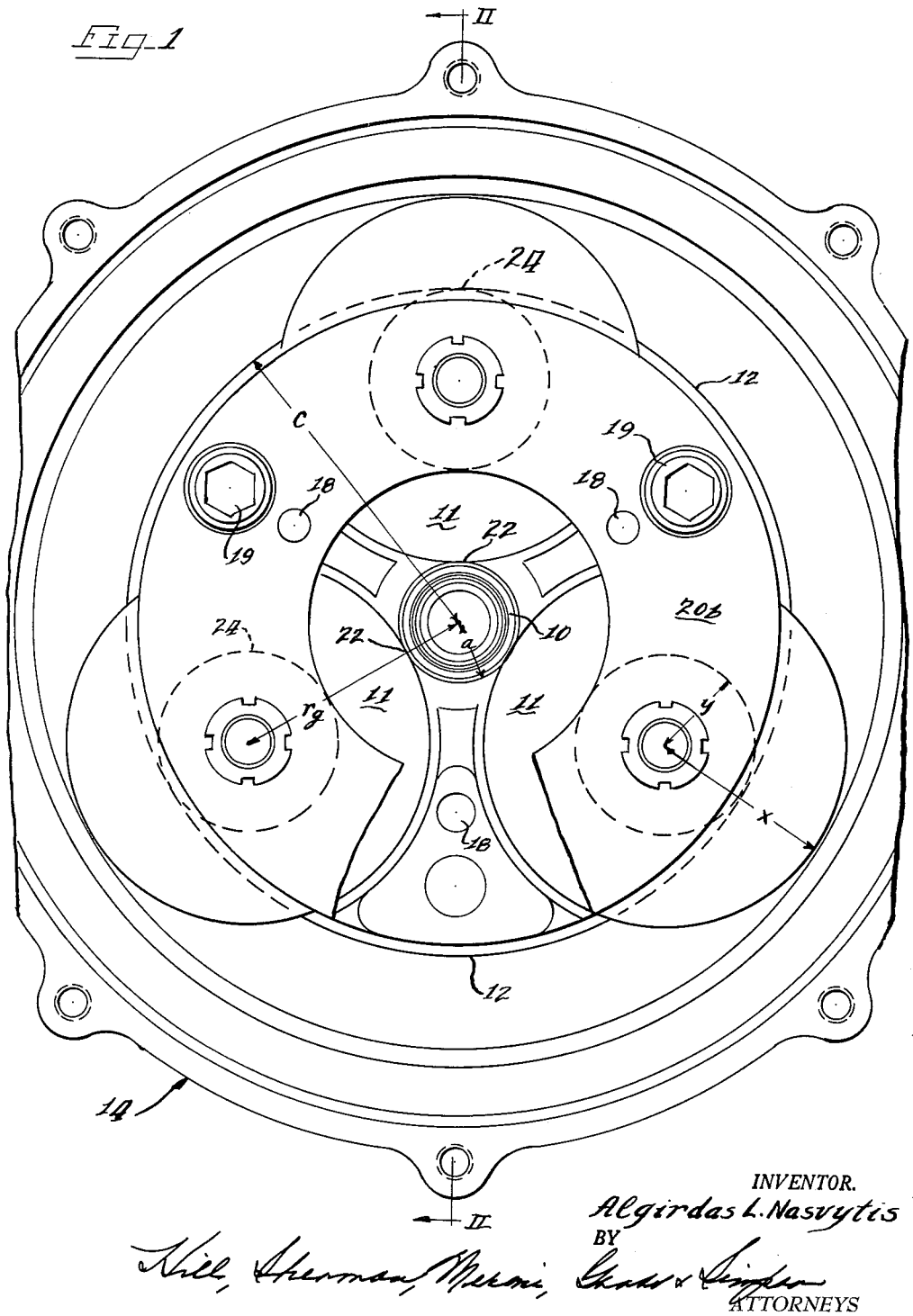

Nov. 9, 1965  A. L. NASVYTIS  3,216,285
COMPOUND PLANETARY FRICTION DRIVE
Filed Aug. 18, 1961  2 Sheets-Sheet 1

INVENTOR.
Algirdas L. Nasvytis
BY
ATTORNEYS

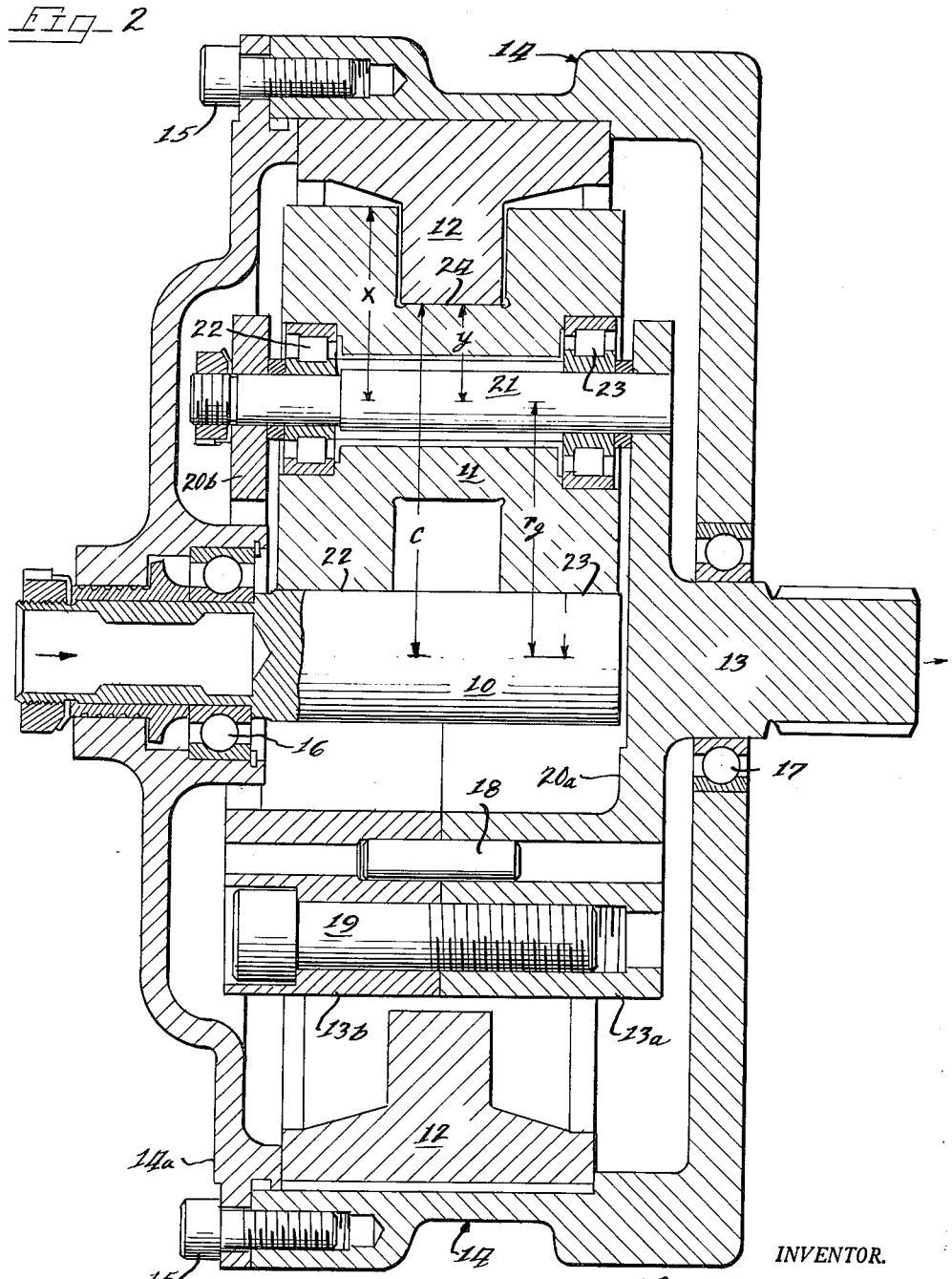

United States Patent Office 3,216,285
Patented Nov. 9, 1965

3,216,285
COMPOUND PLANETARY FRICTION DRIVE
Algirdas L. Nasvytis, Cleveland, Ohio, assignor to
TRW Inc., a corporation of Ohio
Filed Aug. 18, 1961, Ser. No. 132,406
1 Claim. (Cl. 74—798)

The present invention relates to planetary gear drives of the friction type and is, more particularly, concerned with the provision of a more efficient and compact planetary friction drive having high ratio capacity.

Those skilled in the art of gearing are, of course, familiar with friction drive systems in general and many applications of friction roller drives have been made in the planetary gearing field. One major advantage of such friction planetary drives is their very low noise level and lack of vibration of the type ordinarily induced by tooth contact by conventional toothed gear drive systems. Another important advantage in planetary friction gearing systems is improved balancing of the pressures between the sun cylinder and planet cylinder, and between the planet cylinder and ring cylinder as compared with friction drives (variable or constant ratio) of other design types. In such systems the cylinder bearings carry only the torque being transmitted by the systems and, accordingly, high surface pressures necessary to transmit torque without slippage do not introduce excessive friction losses at the bearings. It has been found that the losses of this nature are comparable with the losses of a gear drive in spite of the higher friction surface loading necessary with the friction drive construction.

In the conventional form of friction planetary drive, in which a sun cylinder rotates a plurality of planet cylinders positioned between the sun cylinder and a fixed ring, one important drawback is present. That is, that due to the rotation of the planets and their carrier, the centrifugal pressures developed with relatively high speed of the carrier, decrease the pressure between the planets and the sun cylinder. Accordingly, the original design pressure between the sun cylinder and the planets must be sufficiently great so that at a minimum condition sufficient sun surface pressure is maintained to provide the necessary torque transmission. At the same time, the ring gear or ring cylinder surface will have an increasing centrifugal force acting thereagainst, increasing the frictional losses of the drive. In the past these limitations have limited the use of rotating planet friction drives of common design to relatively low planet carrier, or output, speeds.

In accordance with the present invention a compound friction drive is arranged in a manner employing the centrifugal force inherent in the system to the advantage of the drive rather than to the disadvantage thereof. In accordance with the present invention a stepped planet roller is employed having two diameters. The larger radius is in contact with the sun cylinder input drive member and the smaller radius is in contact with the inside surface of the outer ring. This arrangement provides a considerably smaller over-all dimension compared to the simple planetary drive of the same effective ratio or, similarly, provides a considerably greater reduction for the same drive size. The contact stresses of the planet are better equalized since the contact between the planets and the ring can carry a much higher load to the same stress than can the contact between the planets and the sun cylinder and in the compound system of the present invention the stresses can, where desired, be made exactly equal by employing different contact line lengths since the planets employ two separate friction surfaces which may readily be varied as to width.

It is, accordingly, an object of the present invention to provide an improved planetary friction drive.

Another object of the invention is to provide a compound friction drive of the planetary type providing a substantial reduction in size over previous planetary friction devices.

Still another object of the present invention is to provide a compound friction planetary drive providing a high gear reduction ratio in a minimum of space and with a minimum number of stages.

A feature of the invention resides in the provision of planetary drive planet members having two friction driving surfaces of different diameters.

Still a further feature of the invention resides in the employment of a compound diameter of planetary element in a planetary gear drive having a pair of large diameter surfaces in contact with a sun cylinder surface and a single intermediate small diameter surface in contact with the outer ring surface whereby bending moments applied to the planetary members during loading, are balanced.

Still other and further objects and features of the present invention will at once become apparent to those skilled in the art from a consideration of the attached drawings wherein an embodiment of the invention is shown by way of illustration only, and wherein:

FIGURE 1 illustrates an end elevational view of a planetary friction drive constructed in accordance with the present invention; and FIGURE 2 comprises a cross-sectional view, in elevation, taken along the line II—II of FIGURE 1.

As shown on the drawings:

As may be seen from a consideration of the drawings the friction drive of the present invention provides an input shaft 10, a plurality of planet cylinders 11, a ring cylinder 12 and an output, planet carrier, member 13 all mounted within a housing generally designated at 14. As will be observed, in the embodiment illustrated, the housing rotatably carries the input shaft 10 and the output shaft 13 and is fixedly secured to the ring 12. Thus, as the input shaft 10 rotates it causes the planets 11 to rotate about their own axes and also about the axis of the output shaft 13 which is forced to rotate as the planets walk along the surface of the ring 12.

In practice, the construction of the housing and bearings may be varied. A particularly advantageous arrangement is illustrated, however, and in that arrangement the housing is provided with a cover plate 14a secured to the main housing ring 14 by means of screws 15 which securely clamp the ring 12 in place. The input shaft 10 is mounted in bearings 16 carried in end plate 14a and, similarly, the output shaft 13 is carried in bearings 17. The output carrier 13 is constructed in two halves 13a and 13b as will be seen from a consideration of FIGURE 2. These two halves are pinned into alignment by dowel pins 18 and are secured by screws 19. This arrangement provides, in effect, a pair of radially extending wall surfaces 20a and 20b which support planetary carrier shafts 21. The shafts 21 in turn, by way of bearings 22 and 23, rotatably carry the planet members 11.

It will be apparent, further, that in the construction shown, the input shaft 10 contacts each of the planet members 11 at two annular surface points indicated at 22 and 23. At the same time, the individual planets 11 contact the ring 12 at a surface indicated at 24. The pertinent dimensions of the components are designated in the drawings as $a$ for the radius of the input shaft, $c$ as the radius of the ring surface, $x$ as the radius of the large diameter portion of the individual planet members, and $y$ as the radius of the small diameter portion thereof.

Employing the dimenisonal designations above noted, it will be seen that the reduction ratio, R, of such a compound planetary drive is $$R = \frac{xc}{ay} + 1$$

The force on the sun contact, which may be for any convenience designated $P_a$, equals $$\frac{T}{an} \text{ lbs.}$$

where T is the input torque and $n$ is the number of planets. The force on the ring contact, designated $P_c$, equals $$\frac{TX}{any} \text{ lbs.}$$

For drive systems designed to produce a relatively constant output speed the pressure difference between $P_c$ and $P_a$ may be accurately balanced by the centrifugal force. Thus, the centrifugal force $P_{cf}$ may be designed to equal $$\left[\frac{TX}{any} - \frac{T}{an}\right]K$$

where K is the pressure multiplication factor, usually in the range of 20 to 25 for hardened and polished steel surfaces. Alternatively, the centrifugal force $P_{cf}$ may be computed as equal to $mw^2 r_g$ where $m$ is the mass of the planet member, $w$ is the output rotation in radians per second and $r_g$ is the radius from the axis of rotation to the center of gravity (axis of rotation) of the individual planet. Since, as above noted, $w$ may be considered constant, the necessary pressure matching can be achieved by changing the planet mass, radius $r_g$ or the number of planets. From the above, it will be apparent that the centrifugal force, which in ordinary planetary gearing creates a problem, creates in the present instance, in view of the fact that the fraction $X/y$, as provided by the compound diameters of the planet members 11 is greater than 1, a balancing force that may readily be designed into the gear drive system to provide substantially perfectly balanced forces in the drive, and hence ideal efficiency. Further, by the arrangement of the ring against a reduced diameter portion of the planet, the over-all dimensions of the planetary drive may be substantially less than conventional systems. Further, the stresses are better balanced since the convex-concave mating surfaces of the ring and planetary members can carry a greater load than convex-convex mating surfaces of the sun and planet members and, accordingly, the small radius $y$ is not deleterious to the over-all design. Further, as above noted, the axial length of the contacting surfaces 22 and 23 may be varied relative to the length of the contacting surfaces 24 to exactly equalize the stresses and by providing a pair of surfaces 22 and 23 on opposite sides of a single surface 24, the bending moment of the individual planet roller members is perfectly balanced.

It will be apparent from the above formulas that variations may be made in the exact dimensions to provide a completely balanced ideal efficiency friction planetary drive system. One satisfactory reduction drive particularly useful for marine operation and designed to reduce a 90 horsepower output of 25,000 r.p.m. to a 3,000 r.p.m. output or a reduction ratio of 8.333, employed components having $a$ equals .9 inch, $c$ equals 3.3 inches, $x$ equals 1.6 inches, $y$ equals .8 inch, $r_g$ equals 2.5 inches, with the width of the friction contact surface of the ring being .433 inch and the combined width of the two planet member surfaces contacting the sun cylinder at 22 and 23 comprising .637 inch.

It will be apparent to those skilled in the art from the description above that variations may be made in the structure illustrated without departing from the scope of the novel concepts of the present invention. It is, accordingly, my intent that the scope of the present invention include such revisions and be limited solely by the scope of the hereinafter appended claim.

I claim as my invention:

A planetary gear drive comprising a rotary sun member having a radius $a$, a fixed ring member, a plurality of planet members each having a mass $m$ positioned therebetween for frictional driving contact therewith, and a rotary carrier member carrying said planet members for rotation about axes spaced a distance $r_g$ from the axis of rotation of said carrier member all of said members having cylindrical drive surfaces having parallel axes of revolution, said rotary carrier member being intended to rotate at substantially constant angular velocity $w$, said planet members being $n$ in number and each comprising at least two annular friction drive surfaces of different diameters the larger of which has a radius $x$ in drive relation with said sun member and the smaller of which has a radius $y$ in drive relation with said ring, the components of said planetary gear drive having the dimensional relationship, for a given input torque T of $$\frac{KT}{an}\left[\frac{x}{y} - 1\right] = mw^2 r_g$$

wherein K equals the pressure multiplication factor, said one drive surface being axially separated into two segments spaced by said smaller surface.

References Cited by the Examiner

UNITED STATES PATENTS

| | | | |
|---|---|---|---|
| 622,207 | 4/99 | Collins | 74—798 |
| 1,015,477 | 1/12 | Conant | 74—801 |
| 1,060,073 | 4/13 | Fono | 74—798 |
| 1,190,662 | 7/16 | Matteucci | 74—798 |
| 1,635,162 | 7/27 | Joyce | 74—801 |
| 1,701,723 | 2/29 | Lyons | 74—798 |
| 1,752,542 | 4/30 | Raule | 74—798 |
| 1,782,756 | 11/30 | Edmunds | 74—798 |
| 1,811,921 | 6/31 | Edmunds | 74—798 |
| 2,868,037 | 1/59 | Hindmarch | 74—801 |
| 3,008,354 | 11/61 | Watts et al. | 74—798 |

FOREIGN PATENTS

| | | |
|---|---|---|
| 53,682 | 9/37 | Denmark. |
| 485,820 | 11/17 | France. |
| 1,231,213 | 4/60 | France. |
| 112,015 | 1/19 | Great Britain. |

DON A. WAITE, *Primary Examiner.*

BROUGHTON G. DURHAM, *Examiner.*